(12) United States Patent
Nakagawa

(10) Patent No.: US 10,956,251 B2
(45) Date of Patent: Mar. 23, 2021

(54) ABNORMALITY DETECTION DEVICE

(71) Applicant: Hitachi, Ltd., Tokyo (JP)

(72) Inventor: Shinji Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 15/765,369

(22) PCT Filed: Oct. 9, 2015

(86) PCT No.: PCT/JP2015/078752
§ 371 (c)(1),
(2) Date: Apr. 2, 2018

(87) PCT Pub. No.: WO2017/061028
PCT Pub. Date: Apr. 13, 2017

(65) Prior Publication Data
US 2018/0285183 A1 Oct. 4, 2018

(51) Int. Cl.
*G06F 11/00* (2006.01)
*G06F 11/07* (2006.01)
*G05B 23/02* (2006.01)
*B21B 37/48* (2006.01)
*B21B 37/58* (2006.01)
*B21B 37/00* (2006.01)
(Continued)

(52) U.S. Cl.
CPC ............ *G06F 11/079* (2013.01); *B21B 37/00* (2013.01); *B21B 37/48* (2013.01); *B21B 37/58* (2013.01); *G01M 15/05* (2013.01); *G05B 23/0235* (2013.01); *G06F 11/0727* (2013.01); *G06F 11/0754* (2013.01); *B21B 38/06* (2013.01); *B21B 2275/02* (2013.01); *G05B 2219/36208* (2013.01)

(58) Field of Classification Search
CPC .................................................. G05B 23/0259
See application file for complete search history.

(56) References Cited

U.S. PATENT DOCUMENTS 5,406,502 A * 4/1995 Haramaty .......... G05B 19/4063
702/183
5,623,109 A * 4/1997 Uchida .............. G05B 23/0254
73/865.9
(Continued)

FOREIGN PATENT DOCUMENTS

JP   2013-175108 A   9/2013
JP   2013-218725 A   10/2013
(Continued)

OTHER PUBLICATIONS

*CyberSource Corp.* v. *Retail Decisions, Inc.* (Year: 2011).*
(Continued)

*Primary Examiner* — Jonathan D Gibson
(74) *Attorney, Agent, or Firm* — Crowell & Moring LLP

(57) ABSTRACT

An object of the invention is to provide an abnormality detection device that can detect a processing abnormality of various types of software. The abnormality detection device according to the invention divides an output data series which is output by software into one or more clusters, determines that the output data included in any cluster is normal, and determines that the output data not included in any cluster is abnormal.

12 Claims, 18 Drawing Sheets

(51) Int. Cl.
*G01M 15/05* (2006.01)
*B21B 38/06* (2006.01)

(56) References Cited

U.S. PATENT DOCUMENTS

| | | | | |
|---|---|---|---|---|
| 6,216,066 | B1* | 4/2001 | Goebel | G05B 23/0232 |
| | | | | 340/438 |
| 9,355,007 | B1* | 5/2016 | Eicher | G06F 11/3428 |
| 10,360,093 | B2* | 7/2019 | Rahman | G06F 11/008 |
| 10,592,328 | B1* | 3/2020 | Thompson | H04L 41/0631 |
| 2008/0004840 | A1* | 1/2008 | Pattipatti | G05B 23/0251 |
| | | | | 702/183 |
| 2012/0041575 | A1* | 2/2012 | Maeda | G05B 23/024 |
| | | | | 700/80 |
| 2017/0139760 | A1* | 5/2017 | Rahman | G06F 11/3447 |
| 2018/0024875 | A1* | 1/2018 | Della Corte | G06F 11/3452 |
| | | | | 714/37 |
| 2018/0081762 | A1* | 3/2018 | Inoue | G05B 19/048 |
| 2019/0294524 | A1* | 9/2019 | Gupta | G06F 11/302 |
| 2020/0057690 | A1* | 2/2020 | Hiroe | G06F 11/0751 |

FOREIGN PATENT DOCUMENTS

| | | |
|---|---|---|
| JP | 2015-088154 A | 5/2015 |
| JP | 2015-162140 A | 9/2015 |
| WO | WO 2010/095314 A1 | 8/2010 |

OTHER PUBLICATIONS

International Search Report (PCT/ISA/210) issued in corresponding PCT Application No. PCT/JP2015/078752 dated Nov. 10, 2015 with English Translation, four (4) pages.

Japanese-language Written Opinion (PCT/ISA/237) issued in corresponding PCT/Application No. PCT/JP2015/078752 dated Nov. 10, 2015, five (5) pages.

Japanese-language Office Action issued in counterpart Japanese Application No. 2017-544151 dated Oct. 23, 2019 with English Translation (eight (8) pages).

* cited by examiner

ABNORMALITY DETECTION DEVICE

TECHNICAL FIELD

The present invention relates to a technique of detecting an abnormality of an operation result by software.

BACKGROUND ART

PTL 1 described below discloses a technique for "improving detection accuracy of a device that detects an abnormality sign such as malfunction of plant facilities using time-series data of an instrumentation system," specifically, a technique in which "a local time-series data extracting unit 102 receives an input of a plurality of sets of time-series data, applies a predetermined technique of time division on the sets to divide the plurality of sets of time-series data over time, and extracts local time-series data from the time-divided time-series data, a local time-series data model estimating unit 103 estimates a model each extracted local time-series data using a predetermined model estimation method, a local time-series data clustering unit 104 divides the local time-series data of which a model has been estimated into a plurality of clusters and calculates a representative local parameter representative of each cluster, and an outlier detecting unit 106 detects whether a value which is defined as a distance between evaluation target data in a predetermined period and the representative local parameter is an outlier greater than a threshold value on the basis of the representative local parameters" (see ABSTRACT).

CITATION LIST

Patent Literature

PTL 1: JP 2013-175108 A

SUMMARY OF INVENTION

Technical Problem

In control software in which a process of electronically controlling a control object is mounted, the mounted control process is relatively frequently updated. This update is carried out, for example, by distributing update software via a network. There is a likelihood that the software which is frequently updated will output an erroneous control command value, for example, due to a mounting error.

The technique described in PTL 1 described above is for detecting an abnormality of a control object such as a plant, particularly, an outlier abnormality. Such a technique is mainly used to detect an abnormality which occurs in a control object. However, when an abnormality occurs in control software itself, it is thought that a more appropriate measure can be taken by detecting an abnormality of the control software rather than by detecting an abnormality of a control object. In PTL 1 described above, it is not satisfactorily considered that a processing abnormality in control software is detected.

The invention is made in consideration of the above-mentioned problem and an object thereof is to provide an abnormality detection device that can detect a processing abnormality of various types of software.

Solution to Problem

An abnormality detection device according to the invention divides an output data series which is output by software into one or more clusters, determines that the output data included in any cluster is normal, and determines that the output data not included in any cluster is abnormal.

Advantageous Effects of Invention

With the abnormality detection device according to the invention, it is possible to detect various processing abnormalities of software. Accordingly, it is possible to improve reliability of a control object.

DESCRIPTION OF EMBODIMENTS

First Embodiment

Figure 1:
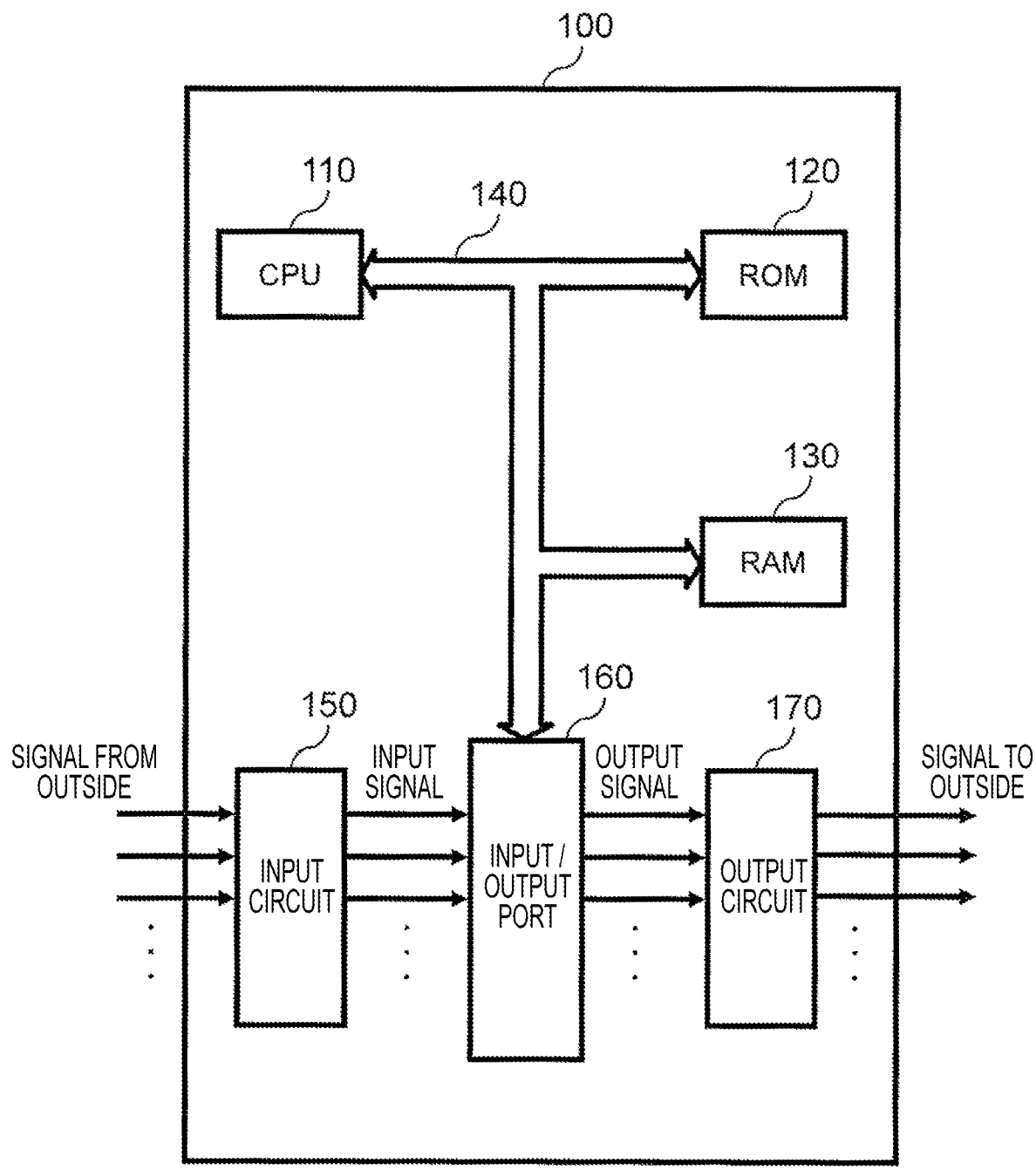
FIG. 1 is a block diagram describing a configuration of an abnormality detection device 100 according to a first embodiment.

FIG. 1 is a block diagram describing a configuration of an abnormality detection device 100 according to a first embodiment of the invention. Here, a configuration example in which the abnormality detection device 100 detects an abnormality of software which is performed by the abnormality detection device 100 will be described, but the invention is not limited thereto.

The abnormality detection device 100 is a device for detecting an abnormality of an operation result by software. The abnormality detection device 100 includes a central processing unit (CPU) 110, a read only memory (ROM) 120, a random access memory (RAM) 130, a data bus 140, an input circuit 150, an input/output port 160, and an output circuit 170.

The input circuit 150 processes a signal from the outside. Examples of the signal from the outside described herein include a detection signal output from a sensor, a data signal from a server, and a data signal from another control device or another data processing device. The signal from the outside is transmitted via a data bus, a dedicated line, a wireless line, or the like. The input circuit 150 processes the signal from the outside and then outputs the resultant signal as an input signal to the input/output port 160. The input/output port 160 writes the input signal to the RAM 130 via the data bus 140. The ROM 120 stores software which is executed by the CPU 110. The CPU 110 executes the software using values which are temporarily stored in the RAM 130. Among operation results which are acquired by causing the CPU 110 to execute the software, data values which are output to the outside of the abnormality detection device 100 are transmitted to the input/output port 160 via the data bus 140, and the input/output port 160 outputs the data values as an output signal to the output circuit 170. The output circuit 170 outputs the output signal as a signal to the outside of the abnormality detection device 100. Examples of the signal to the outside described herein include a drive signal for an actuator, a data signal for the server, and a data signal for another control device or another data processing device.

Figure 2:
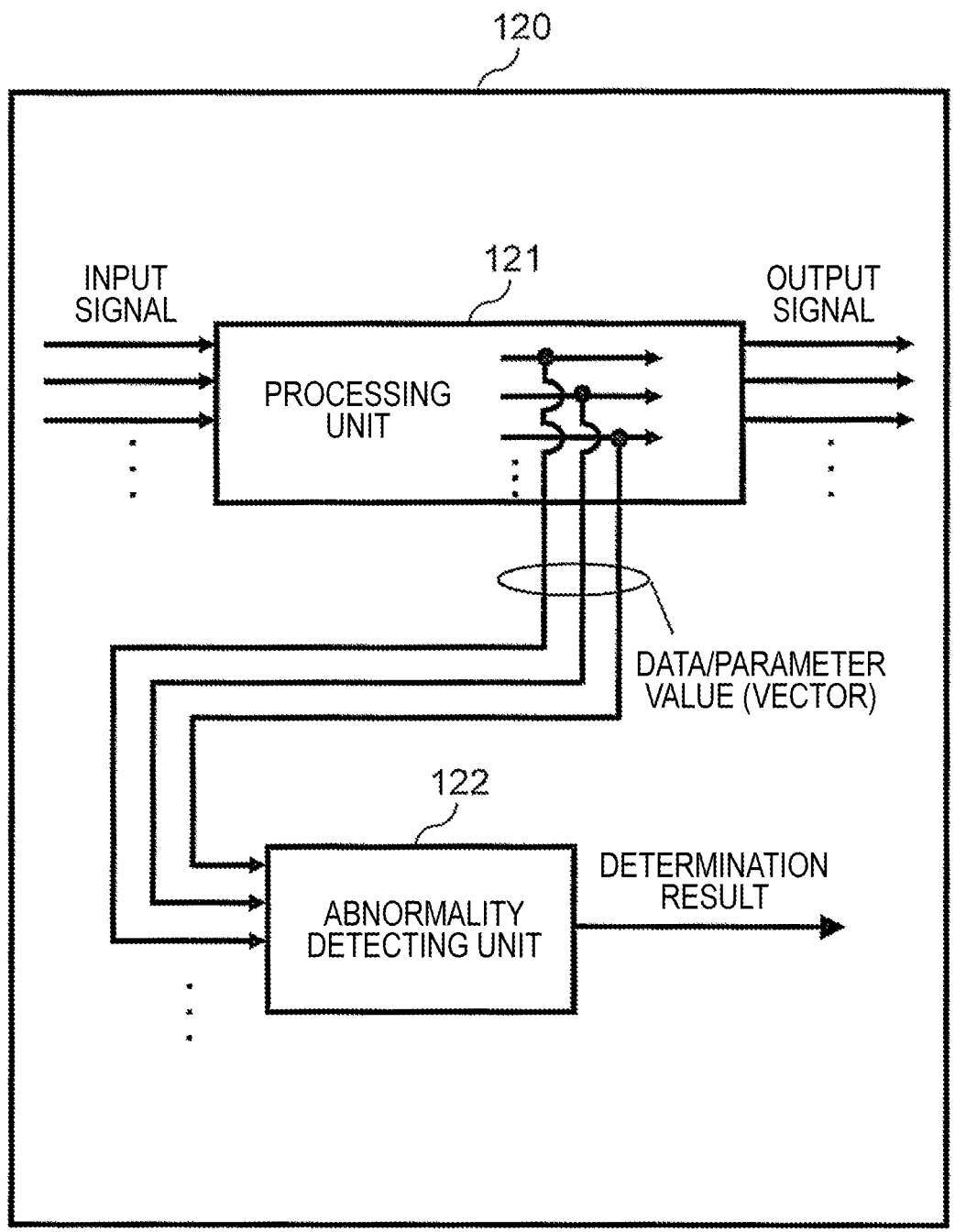
FIG. 2 is a diagram illustrating a configuration of software that is stored in a ROM 120.

FIG. 2 is a diagram illustrating a configuration of software which is stored in the ROM 120. The ROM 120 stores a processing unit 121 and an abnormality detecting unit 122 as software which is executed by the CPU 110. In the following description, for the purpose of description, the software units may be described as operation entities, but it should be noted that the software is actually executed by the CPU 110.

The processing unit 121 calculates, for example, a control command value or a data processing result using an input signal stored in the RAM 130. The processing unit 121 outputs an operation result as the output signal described above with reference to FIG. 1 via the RAM 130 and the data bus 140. The abnormality detecting unit 122 detects a processing abnormality of the processing unit 121 using parameters which are calculated by the processing unit 121. The parameter of which a processing abnormality is detected by the abnormality detecting unit 122 may an operation result (that is, the output signal) from the processing unit 121 or may be a parameter which is intermediately calculated in the course of acquiring the operation result. A determination result (normality or abnormality) from the abnormality detecting unit 122 is output as a signal to the outside via the RAM 130, the input/output port 160, and the output circuit 170.

Figure 3:
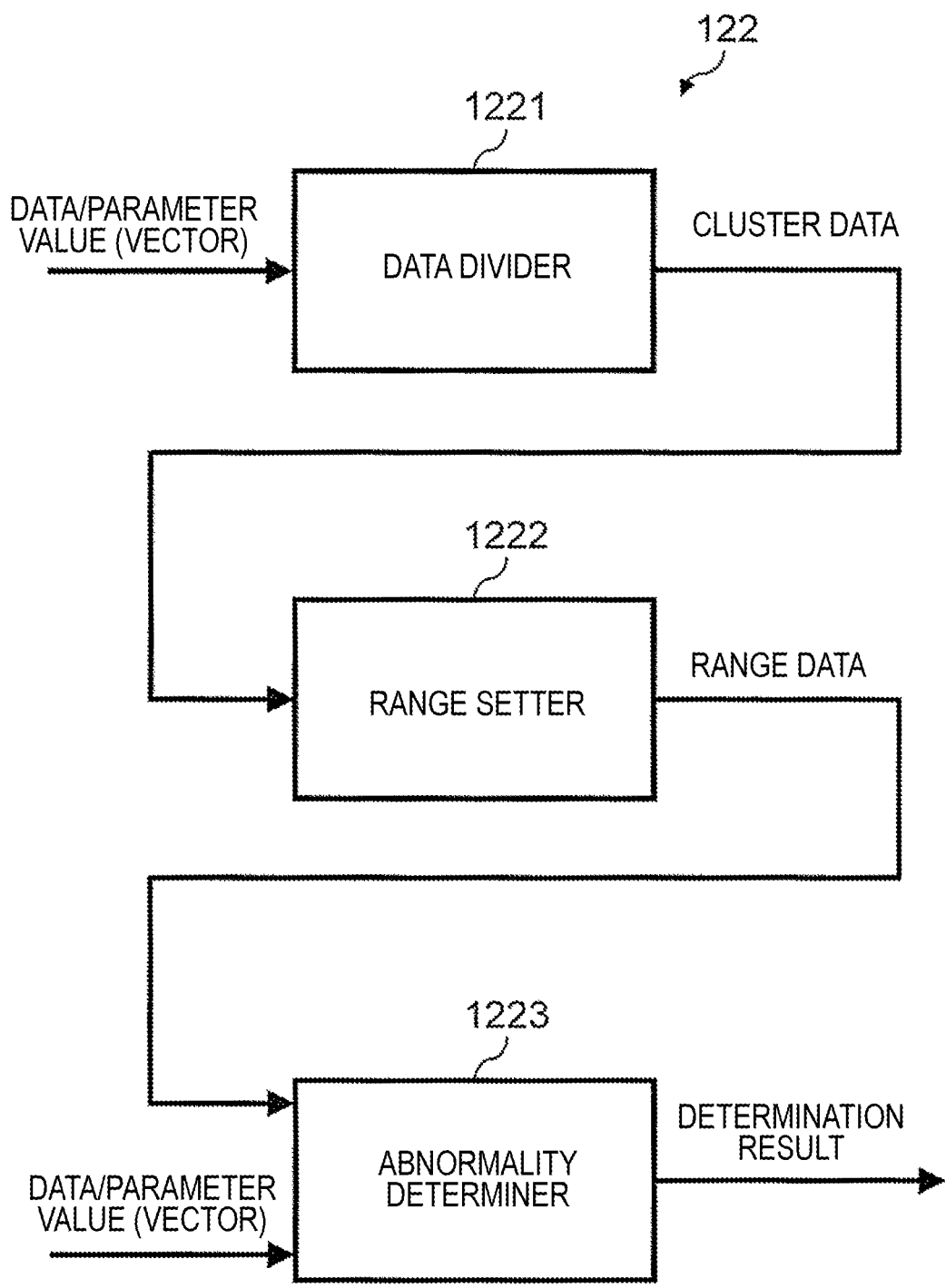
FIG. 3 is a functional block diagram illustrating a detailed configuration of an abnormality detecting unit 122.

FIG. 3 is a functional block diagram illustrating a detailed configuration of the abnormality detecting unit 122. The abnormality detecting unit 122 includes a data divider 1221, a range setter 1222, and an abnormality determiner 1223. Details of these operation units will be additionally described below.

Figure 4:
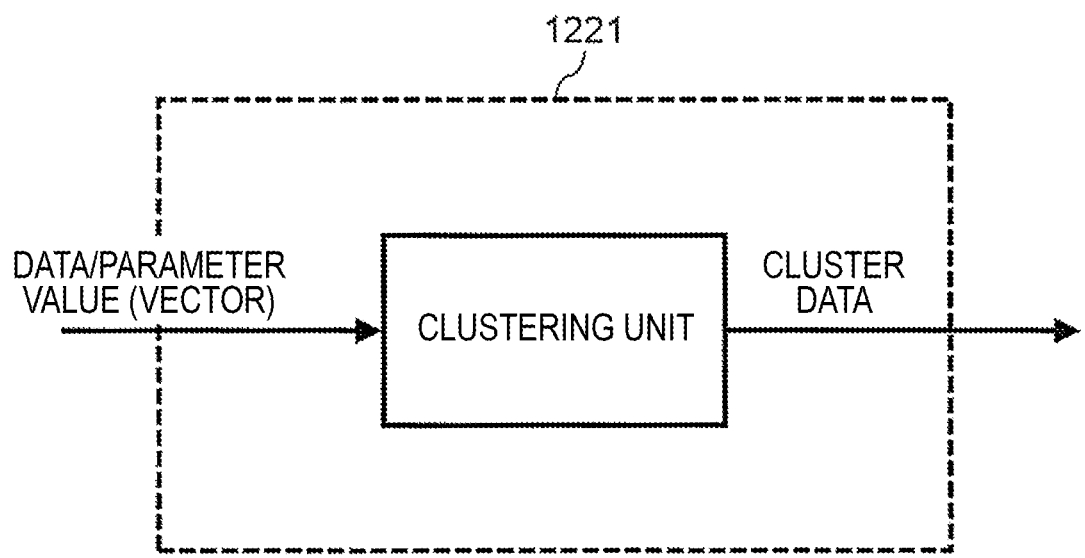
FIG. 4 is a diagram describing an internal process of a data divider 1221.

FIG. 4 is a diagram describing an internal process of the data divider 1221. The data divider 1221 divides a data series, which is acquired by operation of the processing unit 121, into one or more clusters. A specific clustering method can employ, for example, a k-means method. Details of the k-means method are generally known well and thus will not be particularly mentioned herein.

The data divider 1221 outputs cluster data as a clustering result. The cluster data can describe, for example, (a) a cluster number to which each data value in the data series belongs and (b) an average value (a center vector) of data values belonging to each cluster.

Figure 5:
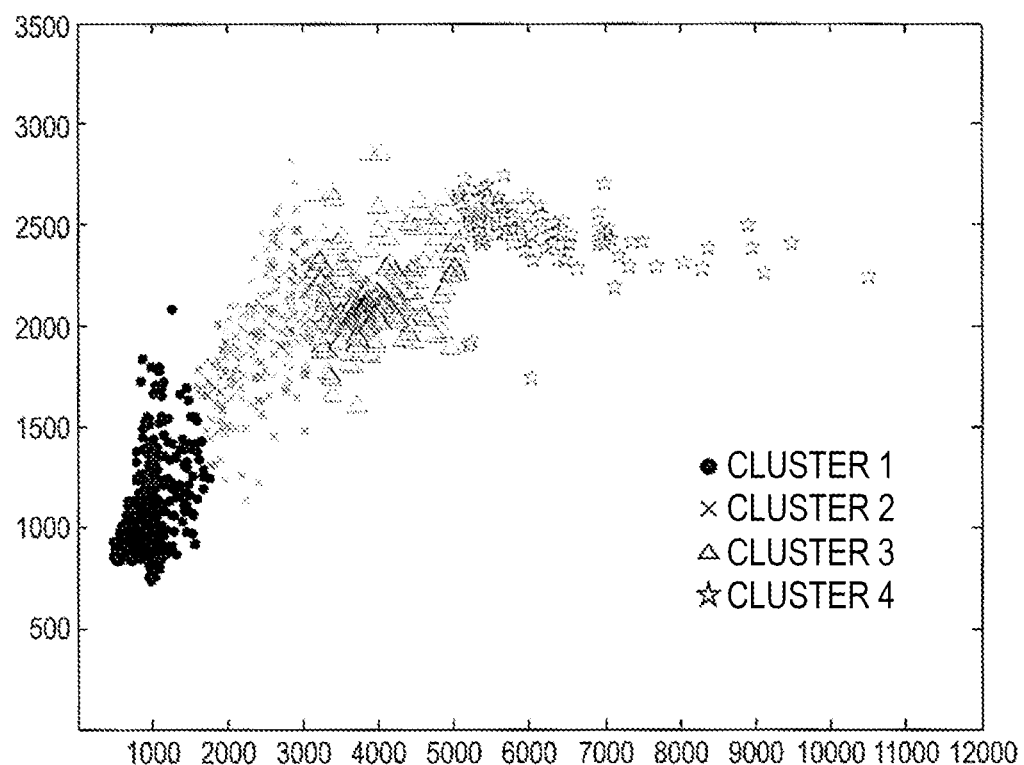
FIG. 5 is a diagram illustrating a clustering result from the data divider 1221.

FIG. 5 is a diagram illustrating a clustering example from the data divider 1221. Here, an example in which two-dimensional vector data is divided into four clusters is illustrated. The operation result from the processing unit 121 includes one or more types of data. For example, the operation result includes (a) a result of calculation of data on a temperature and (b) a result of calculation of data on speed. By correlating these data types with dimensions of the vector, the operation result from the processing unit 121 can be considered as vector data. The data divider 1221 sets a cluster boundary for each dimension of the vector data.

The process of handling the operation result from the processing unit 121 as vector data may be performed by the processing unit 121 or may be performed by the data divider 1221. In any case, the data divider 1221 acquires a data series (for example, a plurality of times of operation results in a time series) for each data type included in the operation result from the processing unit 121 and determines a cluster boundary for each data type.

Figure 6:
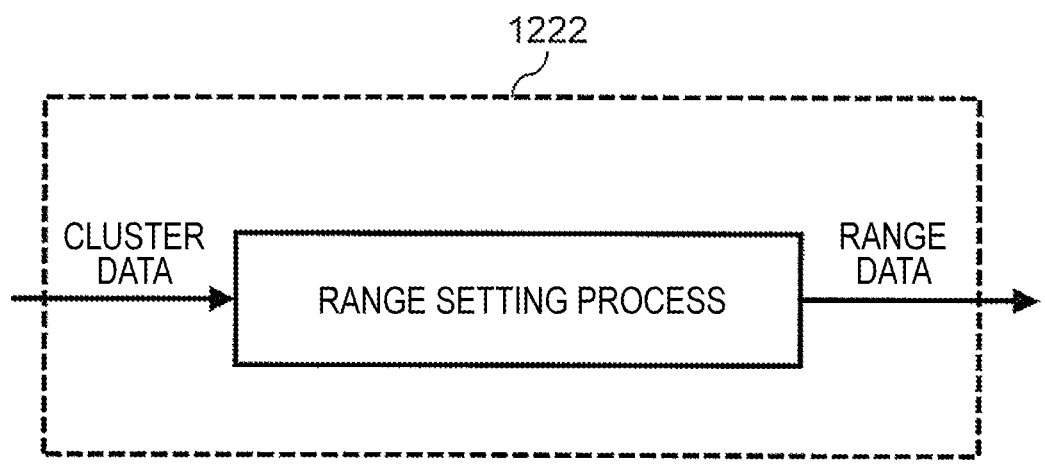
FIG. 6 is a diagram describing an internal process of a range setter 1222.

FIG. 6 is a diagram describing an internal process of the range setter 1222. The range setter 1222 sets a range in which the operation result from the processing unit 121 is considered to be normal using the data series which has been clustered by the data divider 1221. The operation result included in a normal range corresponding to one cluster is considered to be normal.

Specifically, the range setter 1222 sets (a) a minimum value in each dimension of the data series belonging to each cluster as a lower limit value in the dimension of the normal range corresponding to the cluster and sets (b) a maximum value in each dimension of the data series belonging to each cluster as an upper limit value in the dimension of the normal range corresponding to the cluster.

The range setter 1222 outputs range data as the setting result of the normal range. The range data describes a lower limit value and an upper limit value of each dimension which define the normal range corresponding to each cluster.

Figure 7:
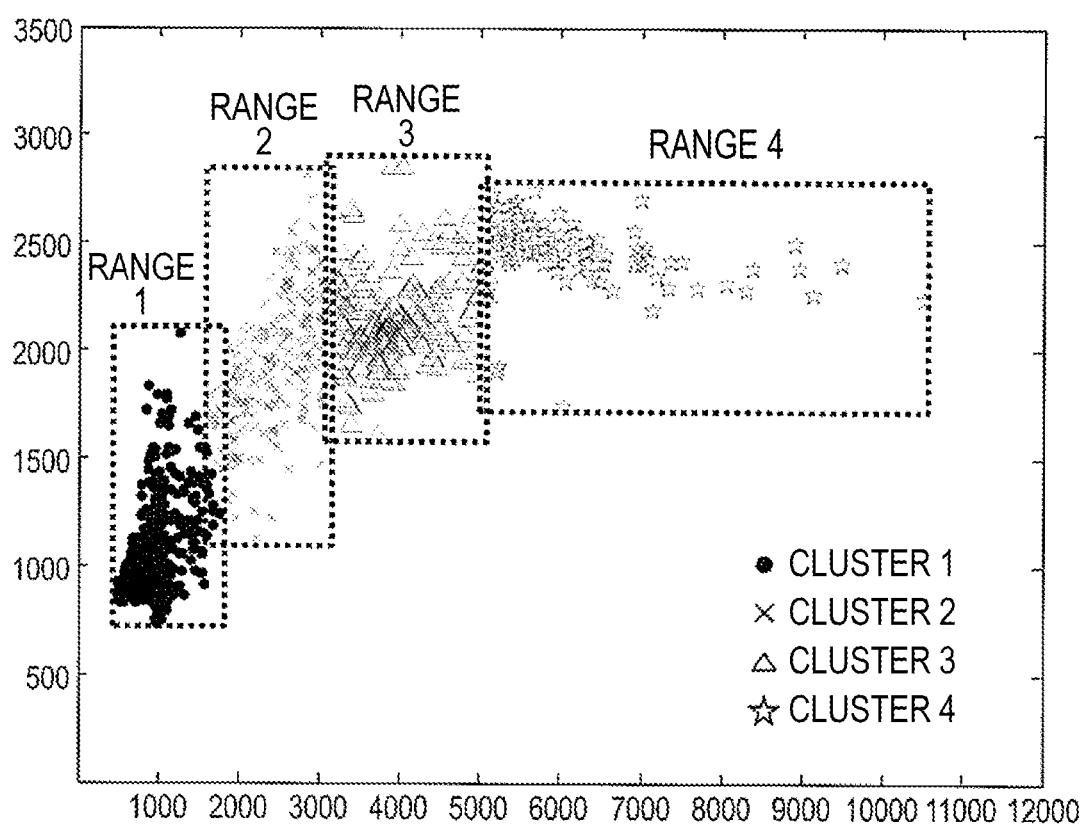
FIG. 7 is a diagram illustrating a result in which the range setter 1222 sets a normal range on the clustering result illustrated in FIG. 5.

FIG. 7 is a diagram illustrating a result in which the range setter 1222 sets a normal range for the clustering result illustrated in FIG. 5. The upper limit value and the lower limit value of the normal range are set for each cluster which is generated by the data divider 1221.

Figure 8:
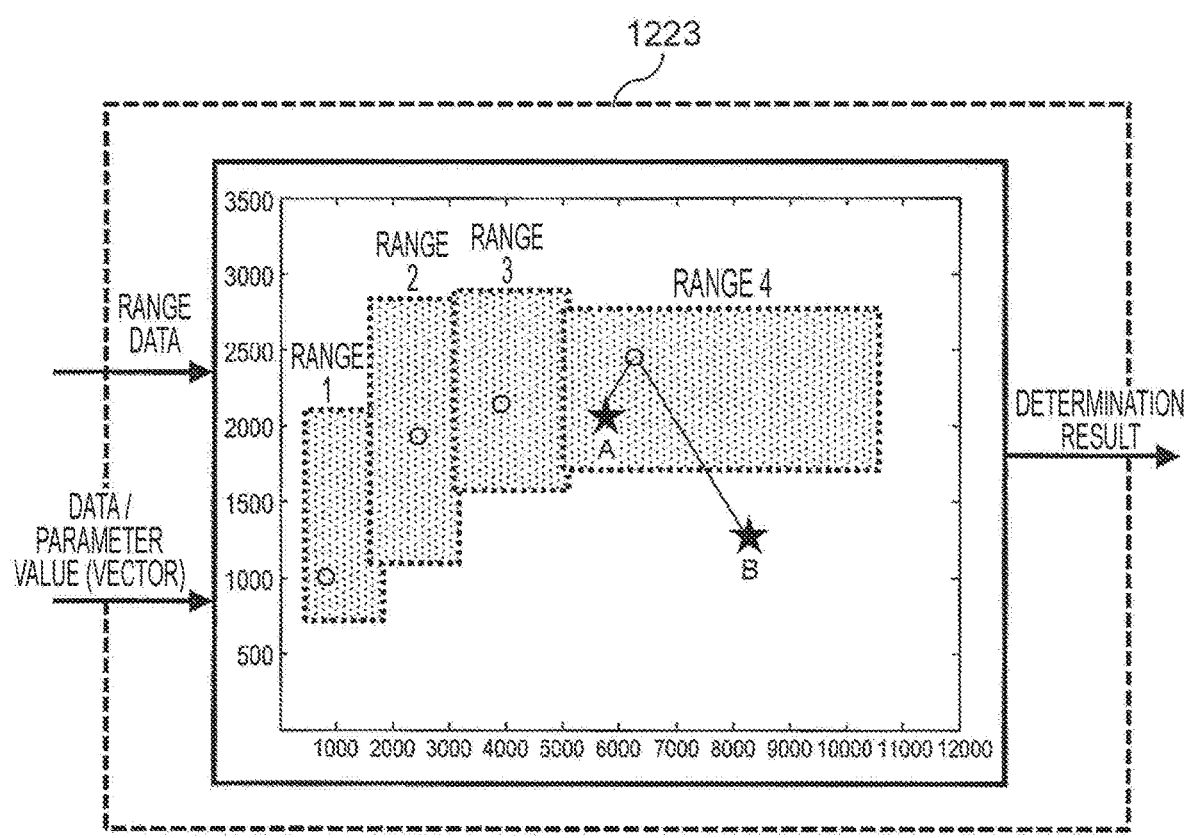
FIG. 8 is a diagram describing an internal process an abnormality determiner 1223.

FIG. 8 is a diagram describing an internal process of the abnormality determiner 1223. The abnormality determiner 1223 acquires a new operation result from the processing unit 121 after the range setter 1222 has set the normal range, and determines whether the new operation result is normal on the basis of the set normal range.

The abnormality determiner 1223 performs the determination of abnormality by the following processes. (a) A cluster closest to the newly acquired operation result is specified. Specifically, among the center vectors of the clusters (the average values of the dimensions), the center vector closest to the newly acquired operation result in the vector space is specified. (b) When the newly acquired operation result is included in the range of the upper limit value and the lower limit value of the normal range corresponding to the specified center vector, it is determined that the newly acquired operation result is normal. When the newly acquired operation result is not included in the range of the upper limit value and the lower limit value of the normal range, it is determined that the newly acquired operation result is abnormal.

First Embodiment: Conclusion

The abnormality detection device 100 according to the first embodiment sets a normal range by clustering the operation results from the processing unit 121 and determines that a new operation result is normal when the new operation result is included in the normal range. Accordingly, when the software (that is, the processing unit 121) which is executed by the CPU 110 causes a processing abnormality, it is possible to detect the abnormality to enhance reliability of the system including the software.

In the first embodiment, for example, an operation result at a time point at which the processing unit 121 is considered to operate normally (when a normal operation has been performed) can be used as a data series which is used for the data divider 1221 and the range setter 1222 to set a normal range. On the other hand, data of which abnormality determination is performed by the abnormality determiner 1223 is, for example, an operation result at a time point at which there is a likelihood that the processing unit 121 operates abnormally (when a normal operation has not been performed). An example thereof is an operation result at a time point at which processing details performed by the processing unit 121 are updated. The same is true of the following embodiments.

Second Embodiment

In the first embodiment, the data divider 1221 and the range setter 1222 set a normal range using a data series (operation results) output from the processing unit 121. The normal range may be set using a data series received from the outside instead of the data series output from the processing unit 121. In a second embodiment of the invention, a specific configuration example thereof will be described.

Figure 9:
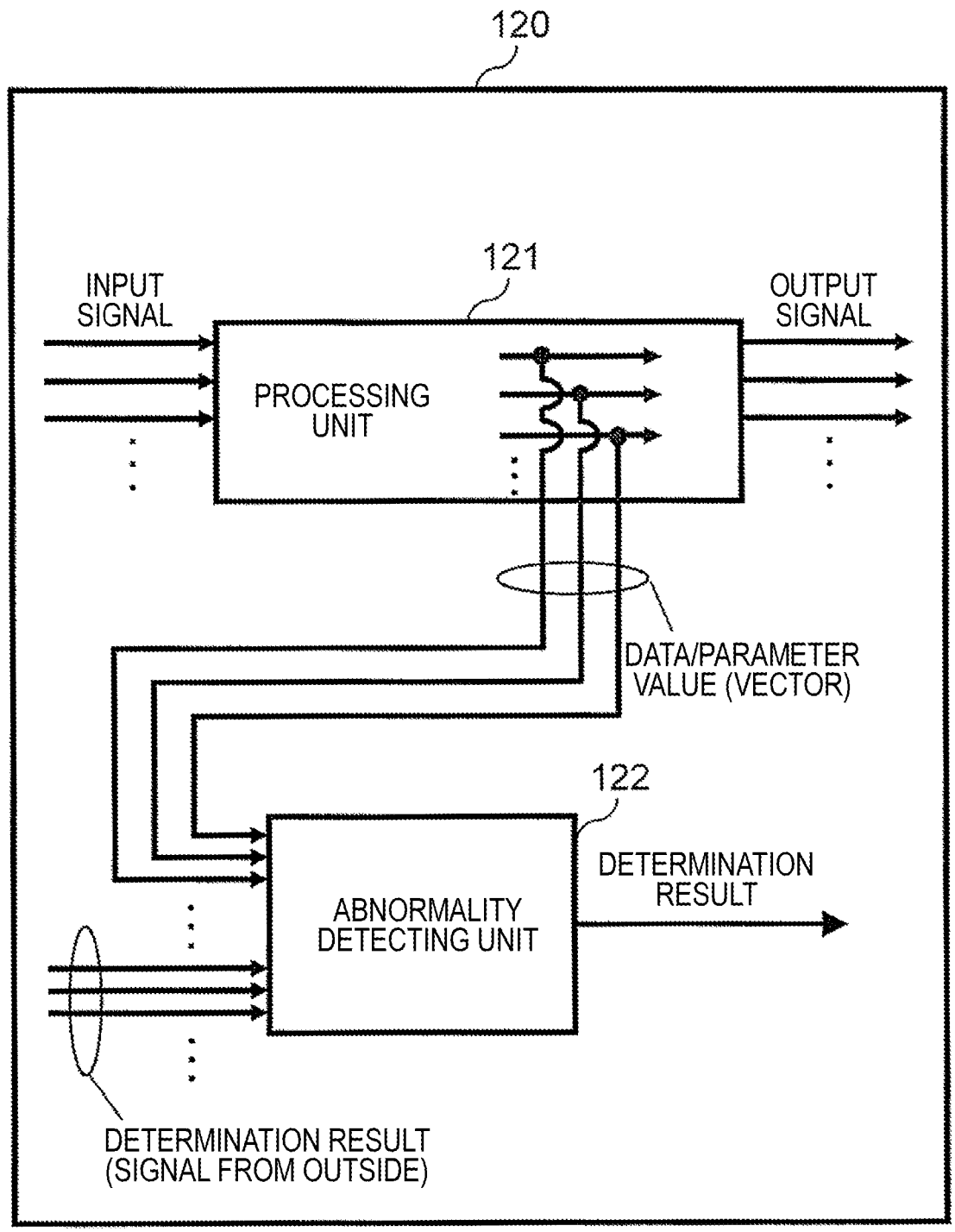
FIG. 9 is a diagram illustrating a configuration of software that is stored in a ROM 120 according to a second embodiment.

FIG. 9 is a diagram illustrating a configuration of software which is stored in a ROM 120 according to the second embodiment. The software configuration is the same as in the first embodiment, except that the abnormality detecting unit 122 receives a data series given by a signal from the outside as the data series which is used to set a normal range. The other configuration of the abnormality detection device 100 is substantially the same as in the first embodiment and thus differences therefrom will be mainly described below.

The signal from the outside which is used by the abnormality detecting unit 122 is written as data to the RAM 130 via the input circuit 150 and the like similarly to the first embodiment. Similarly to the first embodiment, examples of the signal from the outside include a detection signal output from a sensor, a data signal from a server, and a data signal from another control device or another data processing device.

Figure 10:
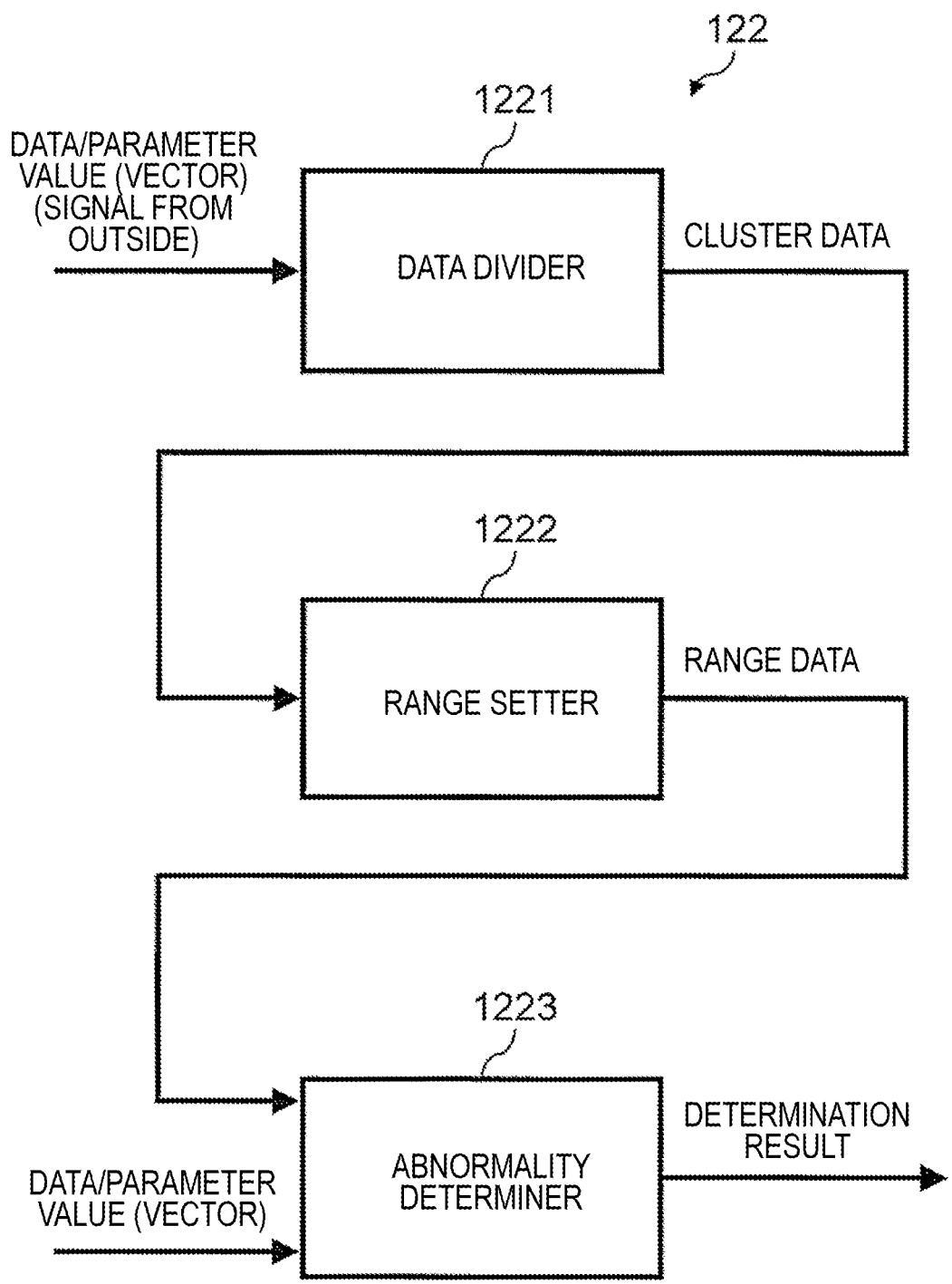
FIG. 10 is a functional block diagram illustrating a detailed configuration of an abnormality detecting unit 122 according to the second embodiment.

FIG. 10 is a functional block diagram illustrating a detailed configuration of the abnormality detecting unit 122 according to the second embodiment. The abnormality detecting unit 122 has the same configuration as in the first embodiment, but is different from that of the first embodiment in that the data divider 1221 and the range setter 1222 perform clustering and setting of a normal range using a data series given from the outside.

Processing details which are performed by the data divider 1221, the range setter 1222, and the abnormality determiner 1223 are the same as in the first embodiment. That is, the abnormality determiner 1223 determines that an operation result from the processing unit 121 is normal when the operation result is included in the normal range set by the data divider 1221 and the range setter 1222, and determines that the operation result is abnormal when the operation result is not included in the normal range.

Second Embodiment: Conclusion

The abnormality detection device 100 according to the second embodiment can set a normal range using a data series received from the outside in advance and can detect an abnormality of the processing unit 121 on the basis of the normal range. Accordingly, the same advantages as in the first embodiment can be achieved. Examples of the data series which is used to set the normal range in advance include a data series which is output from a device having ever operated normally which is the same type of device as the abnormality detection device 100 and the processing unit 121.

In the second embodiment, a data series received from the outside and a data series output from the processing unit 121 may be used in parallel as the data series which is used to set the normal range. For example, these data series may be simply added to extend an amount of data, or one data series thereof may be selected depending on a time at which the processing is performed.

Third Embodiment

In the first and second embodiments, it is determined whether the operation result from the processing unit 121 is abnormal depending on whether the operation result is included in the normal range corresponding to a certain cluster. However, in an actual operation environment, there is also a case in which individual data is included in the normal range, but a temporal change of the data is abnormal. Therefore, in the third embodiment of the invention, a configuration example in which it is additionally determined whether a temporal change pattern of a data series output from the processing unit 121 is normal will be described.

Figure 11:
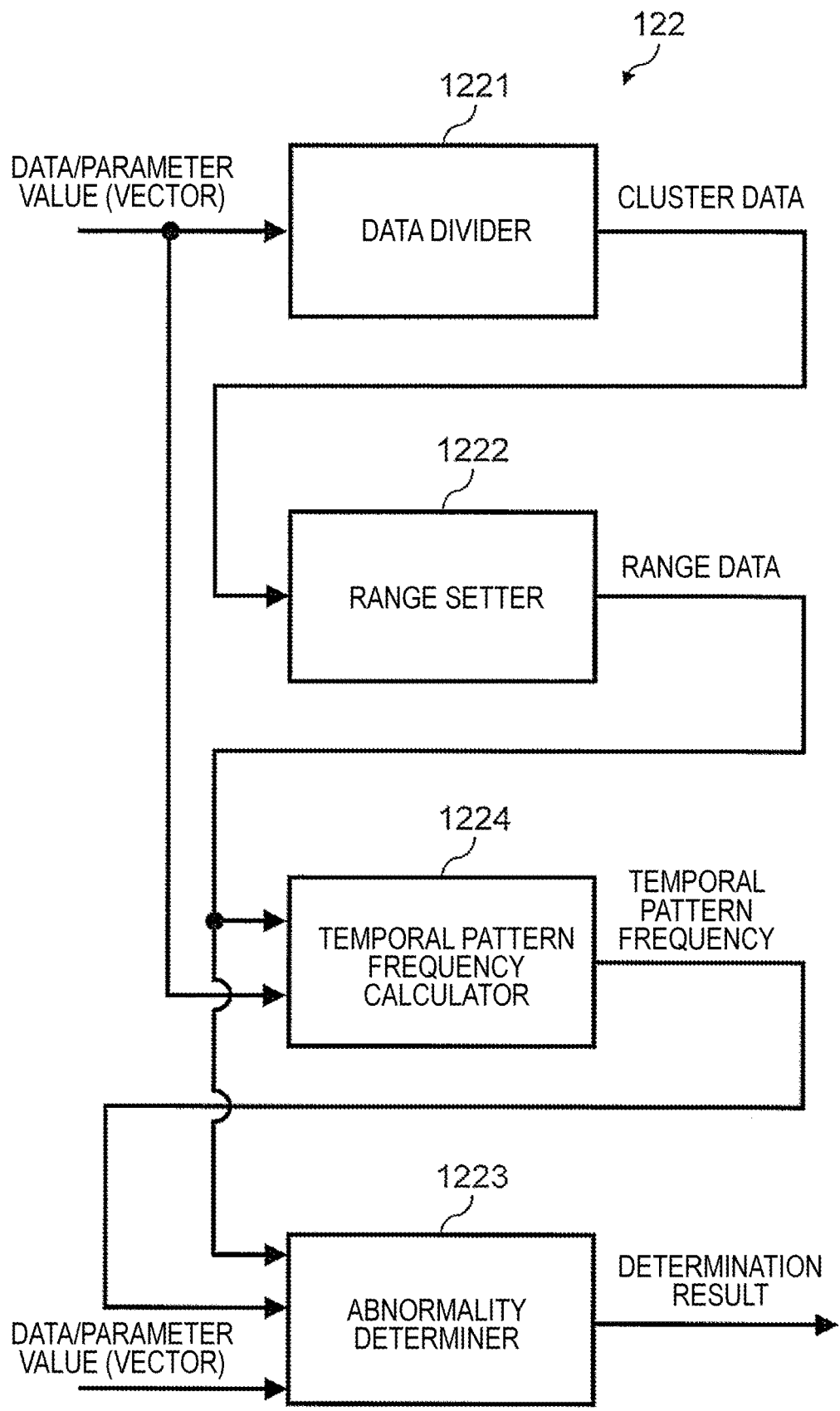
FIG. 11 is a functional block diagram illustrating a detailed configuration of an abnormality detecting unit 122 according to a third embodiment.

FIG. 11 is a functional diagram illustrating a detailed configuration of the abnormality detecting unit 122 according to the third embodiment. The abnormality detecting unit 122 includes a temporal pattern frequency calculator 1224 in addition to the configuration described above in the first embodiment. The other configuration of the abnormality detection device 100 is substantially the same as in the first embodiment and thus differences therefrom will be mainly described below.

The data divider 1221 and the range setter 1222 perform clustering and setting of a normal range using a data series output from the processing unit 121, similarly to the first embodiment. The data series output from the processing unit 121 is assumed to be time-series data in which values acquired whenever the CPU 110 executes the processing unit 121 are described along the execution time with the elapse of time.

The temporal pattern frequency calculator 1224 specifies a temporal transition pattern in which individual data included in the data series output from the processing unit 121 transitions between the clusters with the elapse of time, and calculates an occurrence frequency for each pattern. A specific example thereof will be described later with reference to FIG. 13.

Figure 12:
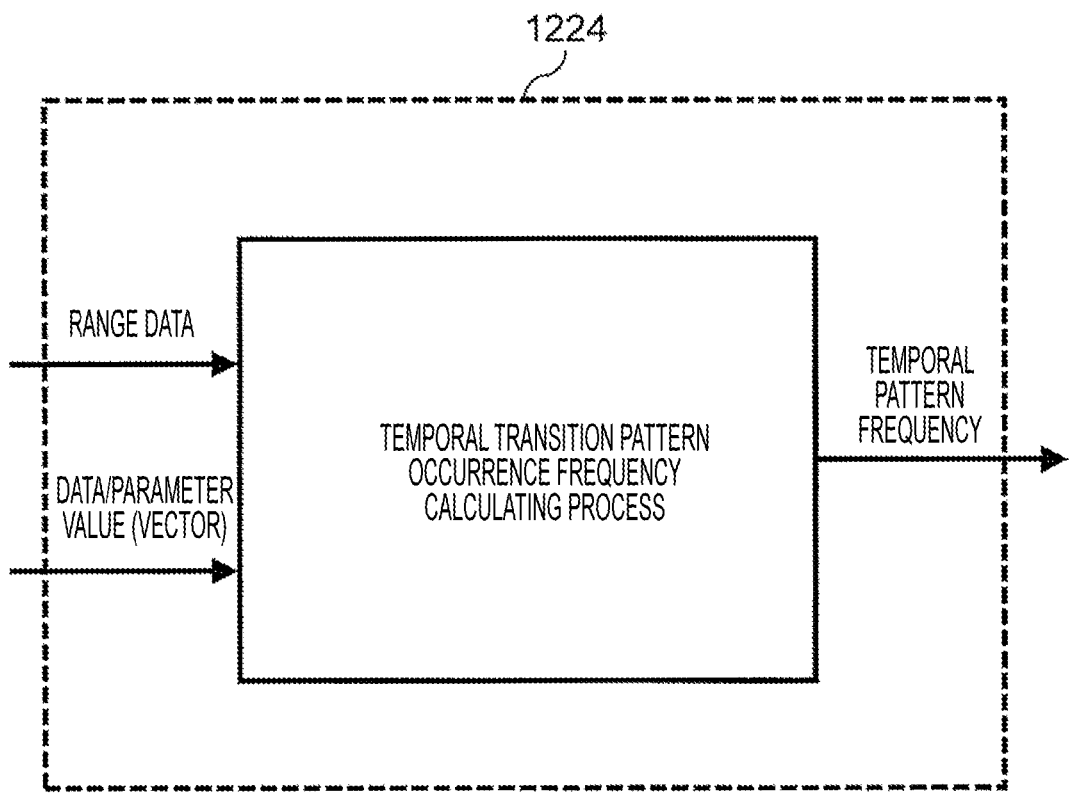
FIG. 12 is a diagram describing an internal process of a temporal pattern frequency calculator 1224.

FIG. 12 is a diagram describing an internal process of the temporal pattern frequency calculator 1224. The temporal pattern frequency calculator 1224 calculates a temporal transition pattern of a data series and an occurrence frequency thereof by the following sequence.

(FIG. 12: Calculation Sequence Step 1)

The temporal pattern frequency calculator 1224 specifies a cluster k to which data k belongs and a cluster k+1 to which data k+1 belongs when the data k (where k is an index indicating time) in the data series output from the processing unit 121 changes to data k+1 with the elapse of time. As the sequence of specifying a cluster to which data belongs, for example, a sequence of specifying a cluster having the closest center vector as described in the first embodiment can be considered. By this step, the temporal transition pattern in which data transitions from the cluster k to the cluster k+1 is specified.

(FIG. 12: Calculation Sequence Step 2)

The temporal pattern frequency calculator 1224 calculates the number of times of temporal change of data in the data series output from the processing unit 121 from the cluster k to the cluster k+1. Similarly, the temporal pattern frequency calculator 1224 also calculates a temporal transition pattern and an occurrence frequency thereof for other data in the data series output from the processing unit 121.

Figure 13:
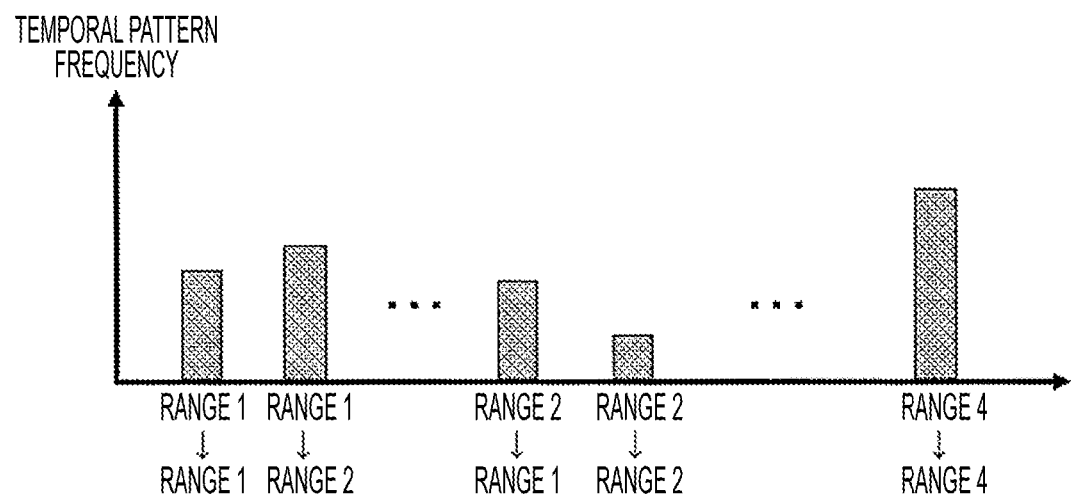
FIG. 13 is a diagram illustrating an example of a temporal transition pattern occurrence frequency which is calculated by the temporal pattern frequency calculator 1224.

FIG. 13 is a diagram illustrating an example of an occurrence frequency of a temporal transition pattern which is calculated by the temporal pattern frequency calculator 1224. The temporal pattern frequency calculator 1224 may calculate a temporal transition pattern between the clusters or may calculate a temporal transition pattern between the normal ranges corresponding to the clusters instead. An example in which a temporal transition pattern between the normal ranges is calculated is described herein. The temporal pattern frequency calculator 1224 may calculate the occurrence frequency, for example, using an easy calculation method such as by dividing the occurrence frequency of the temporal transition pattern by the number of times of updating data.

Figure 14:
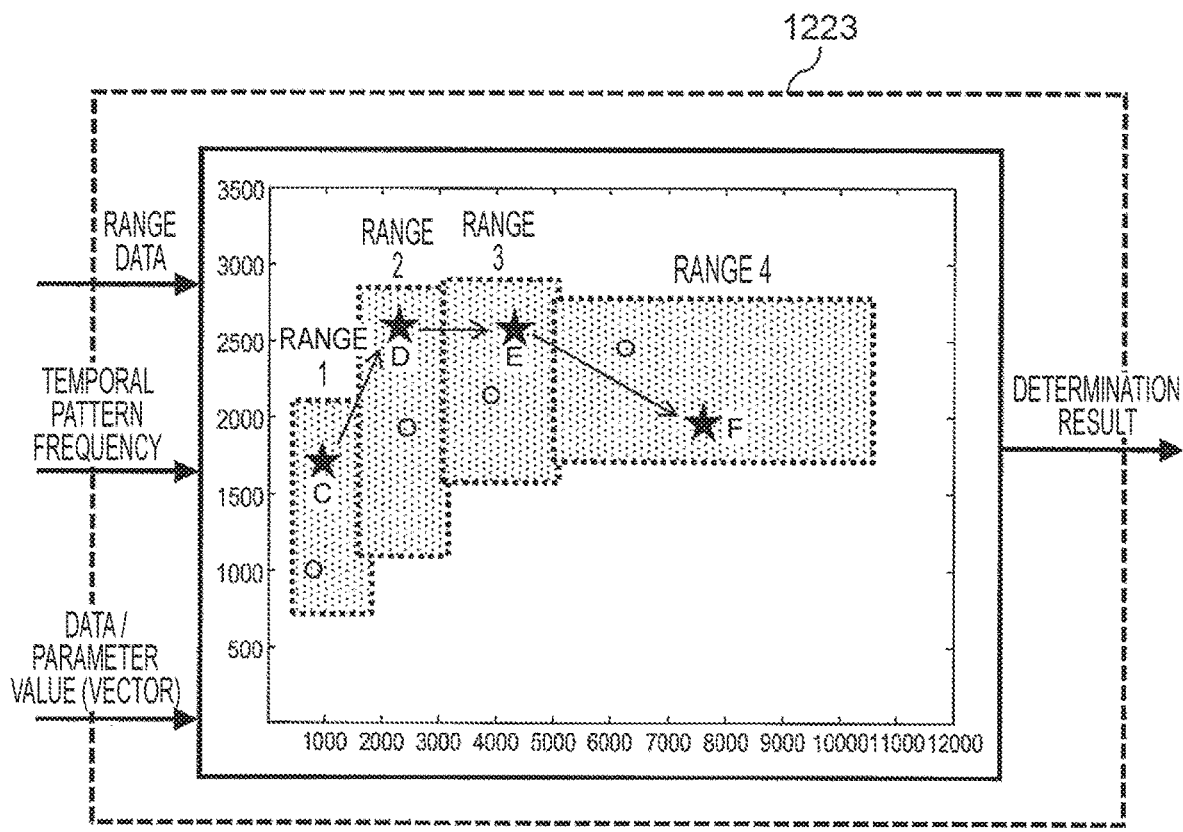
FIG. 14 is a diagram describing an internal process of an abnormality determiner 1223 according to the third embodiment.
Figure 14:
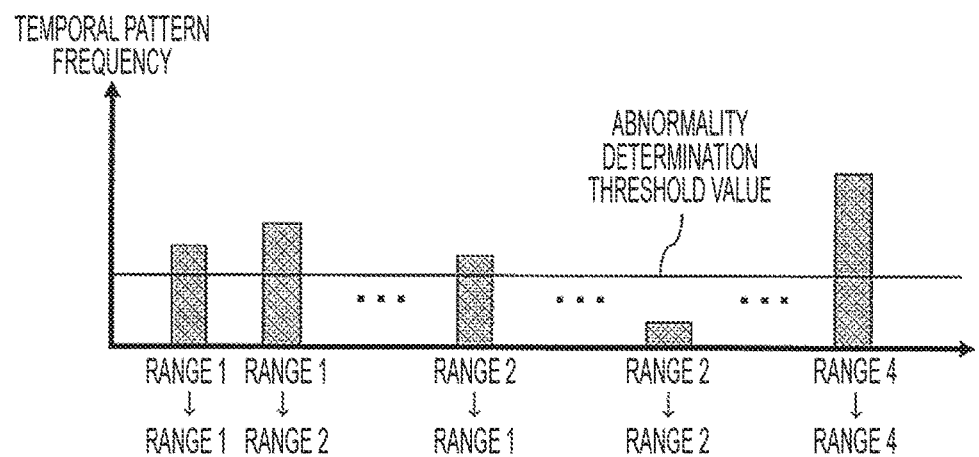

FIG. 14 is a diagram describing an internal process of the abnormality determiner 1223 according to the third embodiment. After the temporal pattern frequency calculator 1224 has calculated the occurrence frequency described with reference to FIG. 12 in advance, the abnormality determiner 1223 acquires new time-series data from the processing unit 121 and determines whether the new time-series data is normal through the following sequence.

(FIG. 14: Determination Sequence Step 1)

The abnormality determiner 1223 specifies a cluster k and a cluster k+1 to which data k and data k+1 (where k is an index indicating time) in a new data series output from the processing unit 121 belong, respectively, through the same sequence as Step 1 described with reference to FIG. 12.

(FIG. 14: Determination Sequence Step 2)

The abnormality determiner 1223 calculates the number of times of temporal change of data in the data series output from the processing unit 121 from the cluster k to the cluster k+1 (or from a normal range k corresponding to each cluster to a normal range k+1). The abnormality determiner 1223 determines that the temporal transition pattern is normal when the occurrence frequency of the temporal transition pattern is equal to or greater than a predetermined value, and determines that the temporal transition pattern is abnormal when the occurrence frequency of the temporal transition pattern is less than the threshold value.

In the example illustrated in a lower part of FIG. 14, since an occurrence frequency of a temporal transition pattern of range 3→range 4 is less than the threshold value, this temporal transition pattern is determined to be abnormal. Since occurrence frequencies of temporal transition patterns of range 1→range 2 and range 2→range 3 are equal to or greater than the threshold value, the temporal transition patterns are determined to be normal.

The threshold value which is used for the abnormality determiner 1223 can be determined depending on the occurrence frequencies of the temporal transition patterns which are calculated in advance by the temporal pattern frequency calculator 1224 through the sequences described with reference to FIGS. 12 and 13. For example, the smallest one of the occurrence frequencies of all the temporal transition patterns (or a value slightly less than that) can be employed as the threshold value. Alternatively, the threshold value may be individually set for each temporal transition pattern. In this case, the occurrence frequency of each temporal transition pattern (or a value slightly less than that) can be employed as a threshold value for the corresponding temporal transition pattern. For example, in the example illustrated in a lower part of FIG. 14, a determination threshold value of range 1→range 1 is set to be smaller than the determination threshold value of range 1→range 2.

Third Embodiment: Conclusion

The abnormality detection device 100 according to the third embodiment specifies a temporal transition pattern of time-series data and an occurrence frequency thereof in advance and determines that a temporal transition pattern of new time-series data is abnormal when the temporal transition pattern and an occurrence frequency do not match the specified ones. Accordingly, even if individual data is included in the normal range described in the first embodiment, it can be detected that the individual data is abnormal when a temporal transition pattern thereof is abnormal.

By using the abnormal determination method described in the third embodiment along with another embodiment, it is possible to improve accuracy of abnormality determination. Accordingly, it is possible to further enhance reliability of software.

Fourth Embodiment

Figure 15:
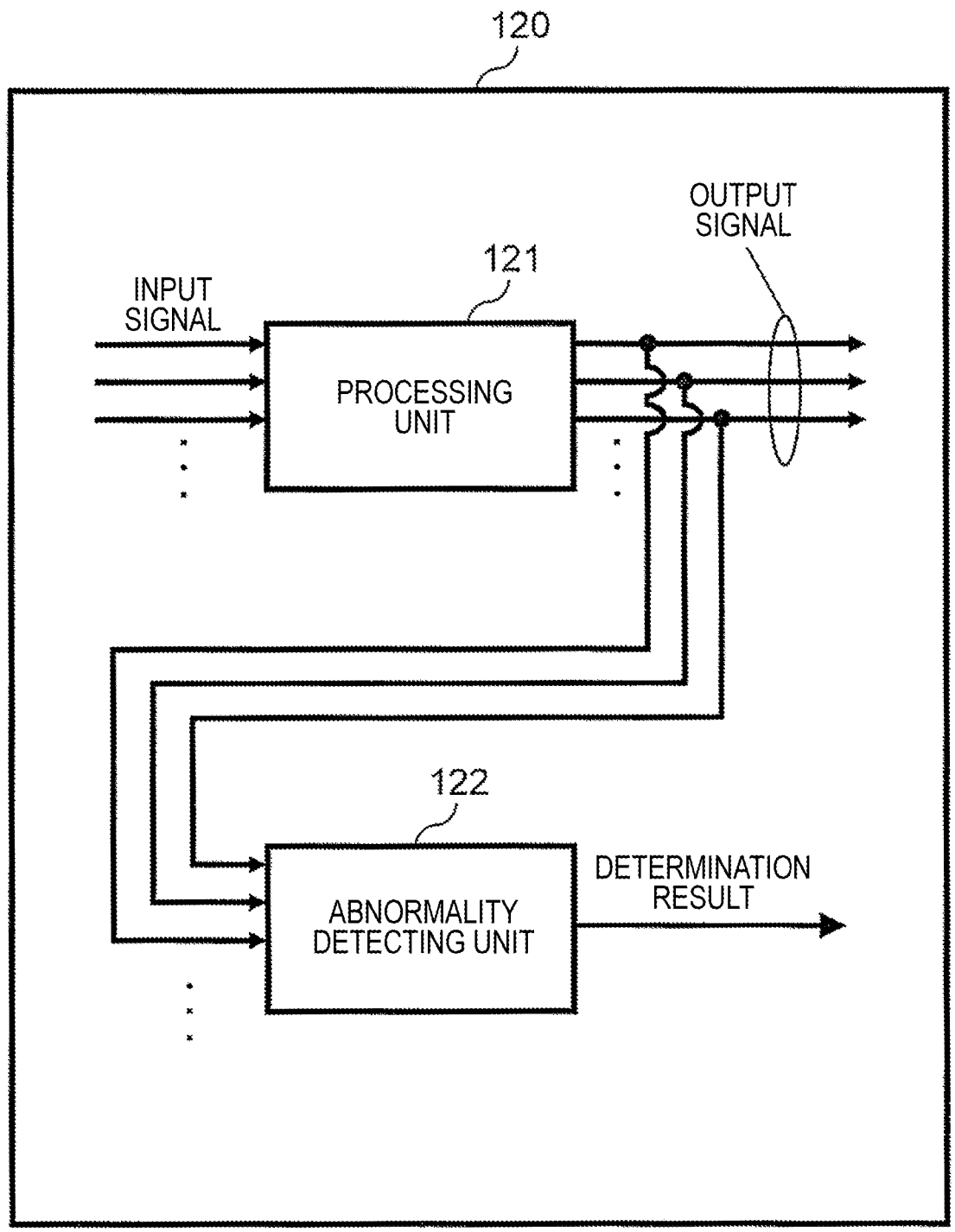
FIG. 15 is a diagram illustrating a configuration of software that is stored in a ROM 120 according to a fourth embodiment.

FIG. 15 is a diagram illustrating a configuration of software which is stored in the ROM 120 according to a fourth embodiment of the invention. The software configuration is the same as in the first embodiment, except that the abnormality detecting unit 122 uses a control command value which is calculated by the processing unit 121 to control a control object (for example, an actuator) 200 as a data series which is used to set a normal range. The other configuration of the abnormality detection device 100 is substantially the same as that in the first embodiment and differences therefrom will be mainly described below.

Figure 16:
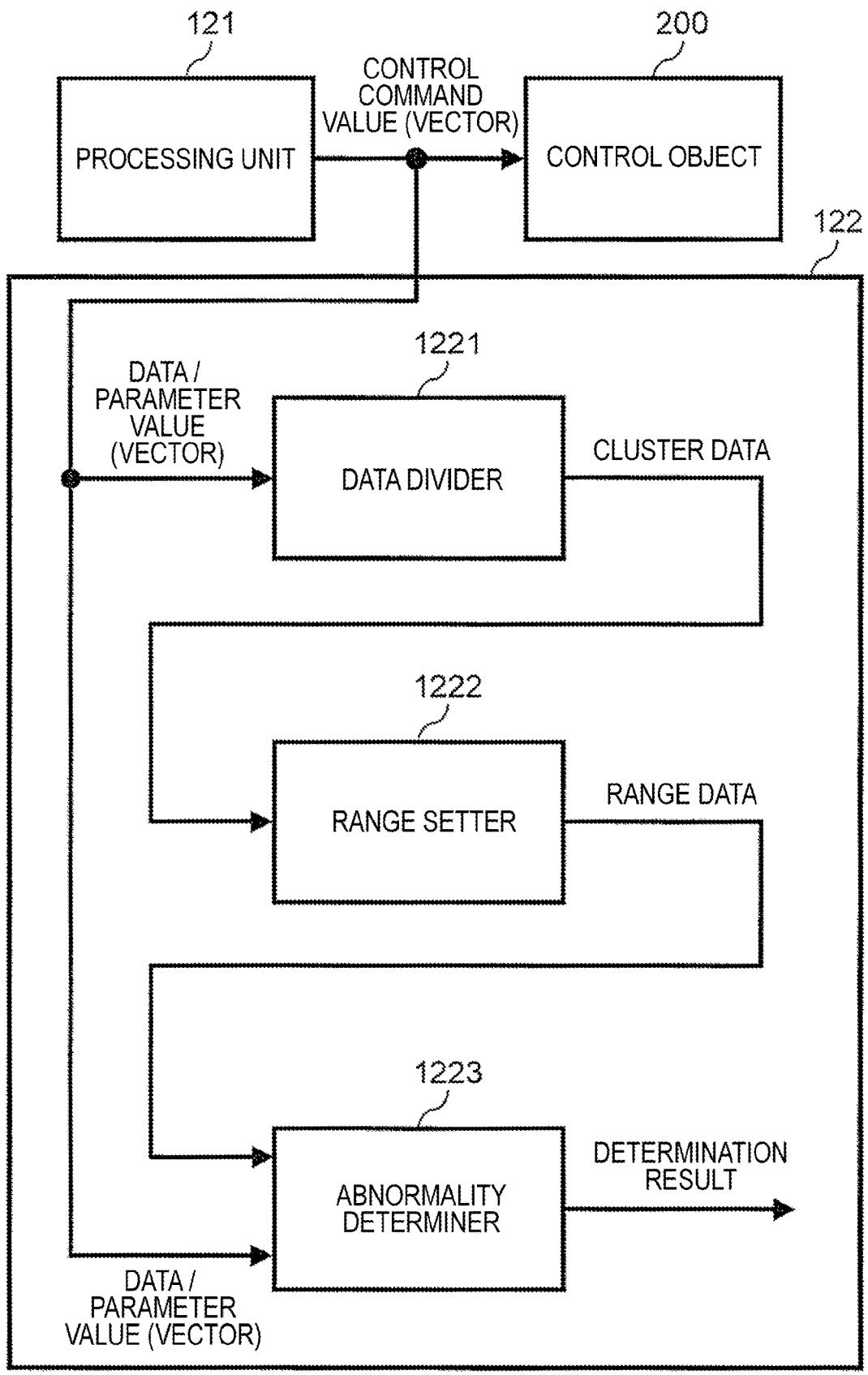
FIG. 16 is a functional block diagram illustrating a detailed configuration of an abnormality detecting unit 122 according to the fourth embodiment.

FIG. 16 is a functional block diagram illustrating a detailed configuration of the abnormality detecting unit 122 according to the fourth embodiment. The abnormality detecting unit 122 has the same configuration as in the first embodiment, and is different from that in the first embodiment in that clustering, setting of a normal range, and determination of an abnormality are performed using a control command value output from the processing unit 121.

The abnormality detection device 100 according to the fourth embodiment performs the same determination of an abnormality as in the first embodiment using a control command value output from the processing unit 121. Accordingly, it is possible to detect that a newly acquired control command value is not in a normal range. Accordingly, since an abnormality of control software itself can be detected before a control object 200 receives the control command value, it is possible to distinguish an abnormality occurring in the control object and an abnormality occurring in control software from each other.

Fifth Embodiment

Figure 17:
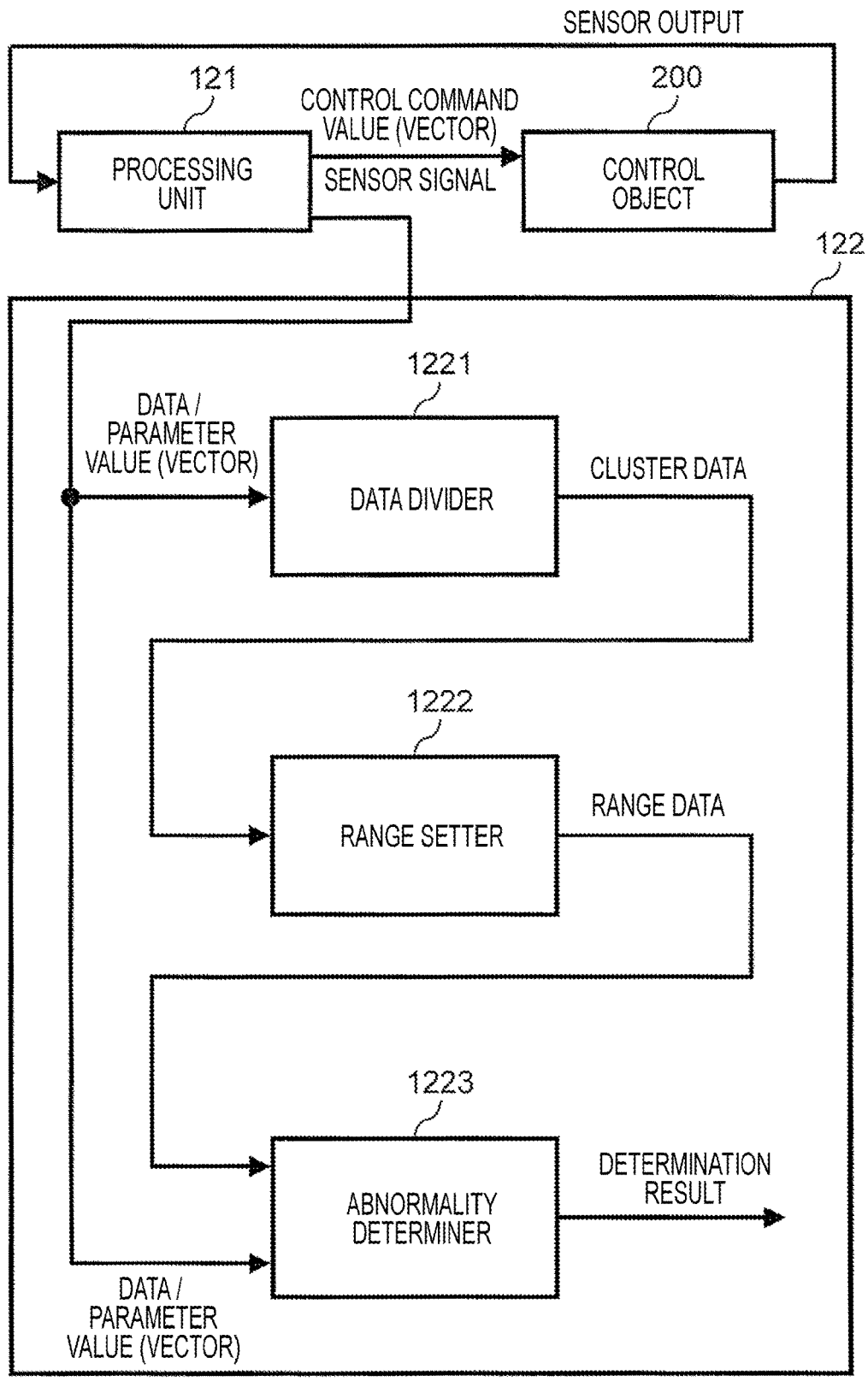
FIG. 17 is a functional block diagram illustrating a detailed configuration of an abnormality detecting unit 122 according to a fifth embodiment.

FIG. 17 is a functional block diagram illustrating a detailed configuration of the abnormality detecting unit 122 according to a fifth embodiment of the invention. The abnormality detecting unit 122 has the same configuration as in the first embodiment, except that the abnormality detecting unit 122 uses an output signal from a sensor disposed in a control object 200 or a result obtained by causing the processing unit 121 to perform a predetermined process on the output signal from the sensor as a data series which is used to set a normal range. The other configuration of the abnormality detection device 100 is substantially the same as in the first embodiment and thus differences therefrom will be mainly described below.

The control object 200 may include a sensor associated with a control value, for example, in order to provide feedback which is used for the processing unit 121 to calculate a control command value. The processing unit 121 can calculate a control command value using an output signal from the sensor. The processing unit 121 may further perform calculation for performing a signal process on the output signal from the sensor. Examples of the process which is performed on the output signal from the sensor include a filtering process for removing noise, a physical quantity converting process, and a compensation process (a learning process) accompanying a variation in sensor characteristics.

The abnormality detecting unit 122 performs determination of an abnormality on a sensor output signal or a data series acquired by performing calculation thereon using the method described in the first embodiment. In any case, a data series which is internally used by the processing unit 121 is acquired.

The abnormality detection device 100 according to the fifth embodiment performs the same determination of an abnormality as in the first embodiment using the sensor output signal which is used by the processing unit 121 or the result obtained by processing the sensor output signal. Accordingly, it is possible to detect a sensor signal value which is internally used by the processing unit 121 or an abnormality in a process which is performed thereon. That is, it is possible to detect an abnormality associated with a part of control software that processes a sensor signal.

Sixth Embodiment

Figure 18:
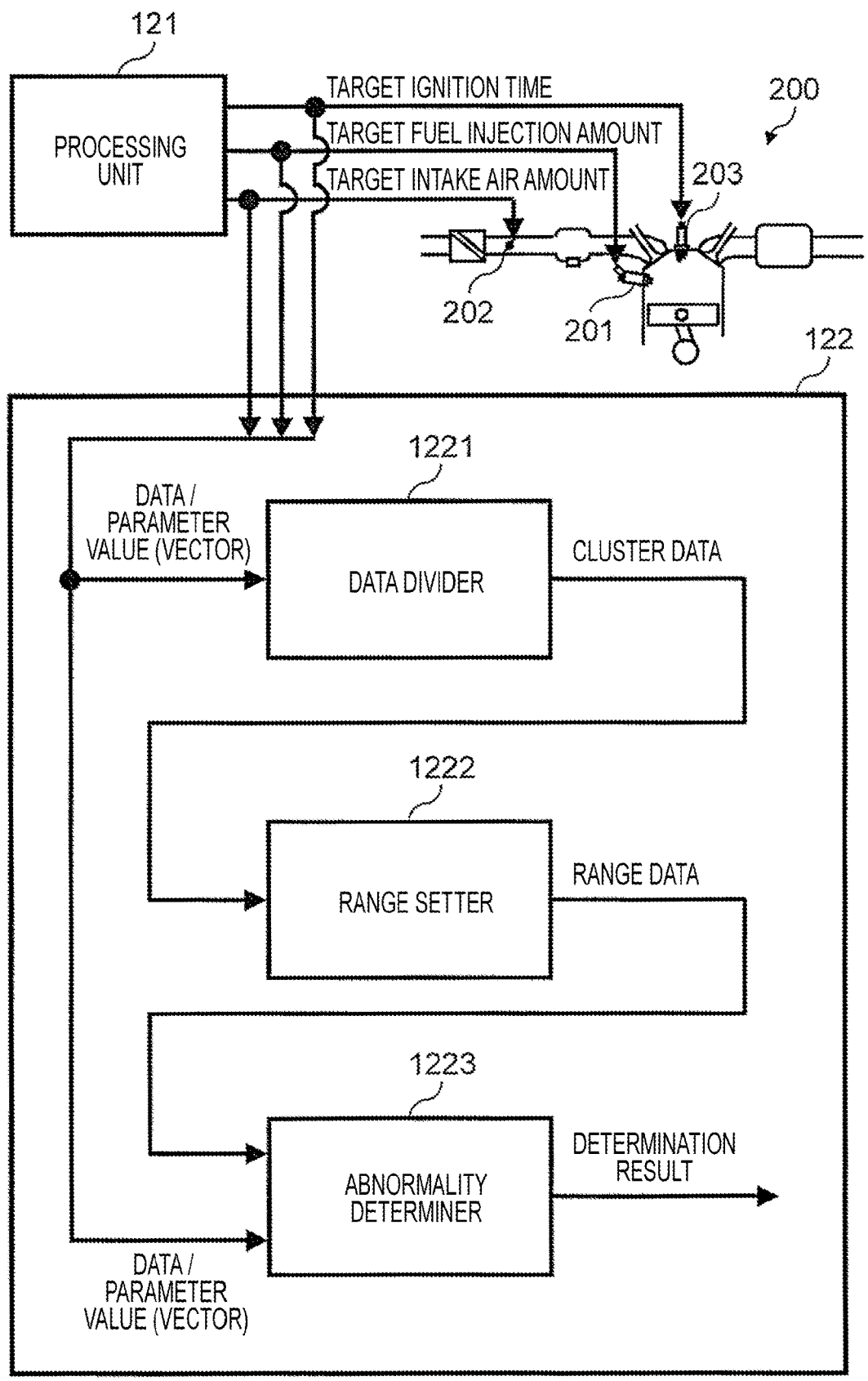
FIG. 18 is a diagram illustrating a specific example of a control object 200 according to a sixth embodiment.

FIG. 18 is a diagram illustrating a specific example of a control object 200 according to a sixth embodiment of the invention. The control object 200 in the sixth embodiment is an internal combustion engine such as an engine. The processing unit 121 calculates (a) a target fuel injection amount from a fuel injection valve 201, (b) a target intake air amount in an electronic throttle 202, and (c) a target ignition time of an ignition plug 203 as a control command value for functional units of the internal combustion engine. The other configuration is the same as in the fourth embodiment.

The abnormality detection device 100 according to the sixth embodiment performs the same determination of an abnormality as in the first embodiment using a control command value (such as an intake air amount, a fuel injection amount, or an ignition time) for the internal combustion engine. Accordingly, since it can be detected that a newly acquired control command value (such as an intake air amount, a fuel injection amount, or an ignition time) is not within a normal range, it is possible to detect an abnormality of engine control software. It is also possible to enhance reliability of an engine control system including the engine control software.

Seventh Embodiment

Figure 19:
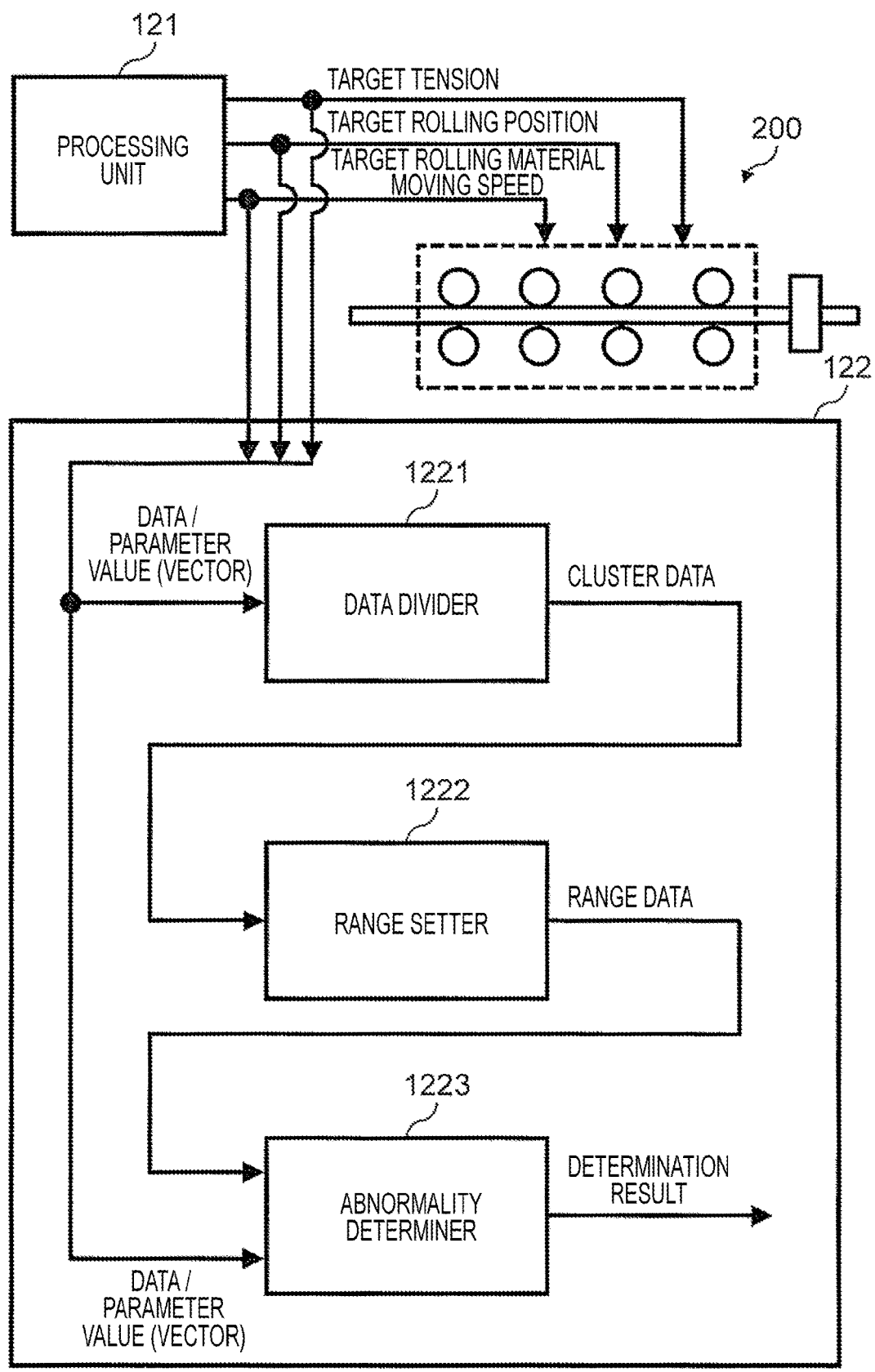
FIG. 19 is a diagram illustrating a specific example of a control object 200 according to a seventh embodiment.

FIG. 19 is a diagram illustrating a specific example of a control object 200 according to a seventh embodiment of the invention. The control object 200 in the seventh embodiment is a rolling process of a steel plant. The processing unit 121 calculates (a) a target tension, (b) a target rolling position, and (c) a target rolling material moving speed as a control command value for the rolling process. The other configuration is the same as in the fourth embodiment.

The abnormality detection device 100 according to the seventh embodiment performs the same determination of an abnormality as in the first embodiment using a control command value (such as a tension, a rolling position, or a rolling material moving speed) for the rolling process. Accordingly, since it can be detected that a newly acquired control command value (such as a tension, a rolling position, or a rolling material moving speed) is not within a normal range, it is possible to detect an abnormality in rolling process control software. It is also possible to enhance reliability of a rolling process and a steel plant including the rolling process control software.

Eighth Embodiment

In the first to eighth embodiments, determination of an abnormality is performed on the basis of whether an operation result newly acquired from the processing unit 121 is included in a normal range. This means that, when the newly acquired operation result is the same as one of data series used to set the normal range, the new operation result can be considered to be normal. Therefore, in an eighth embodiment of the invention, a configuration example in which it is notified that such data is normal will be described.

Figure 20:
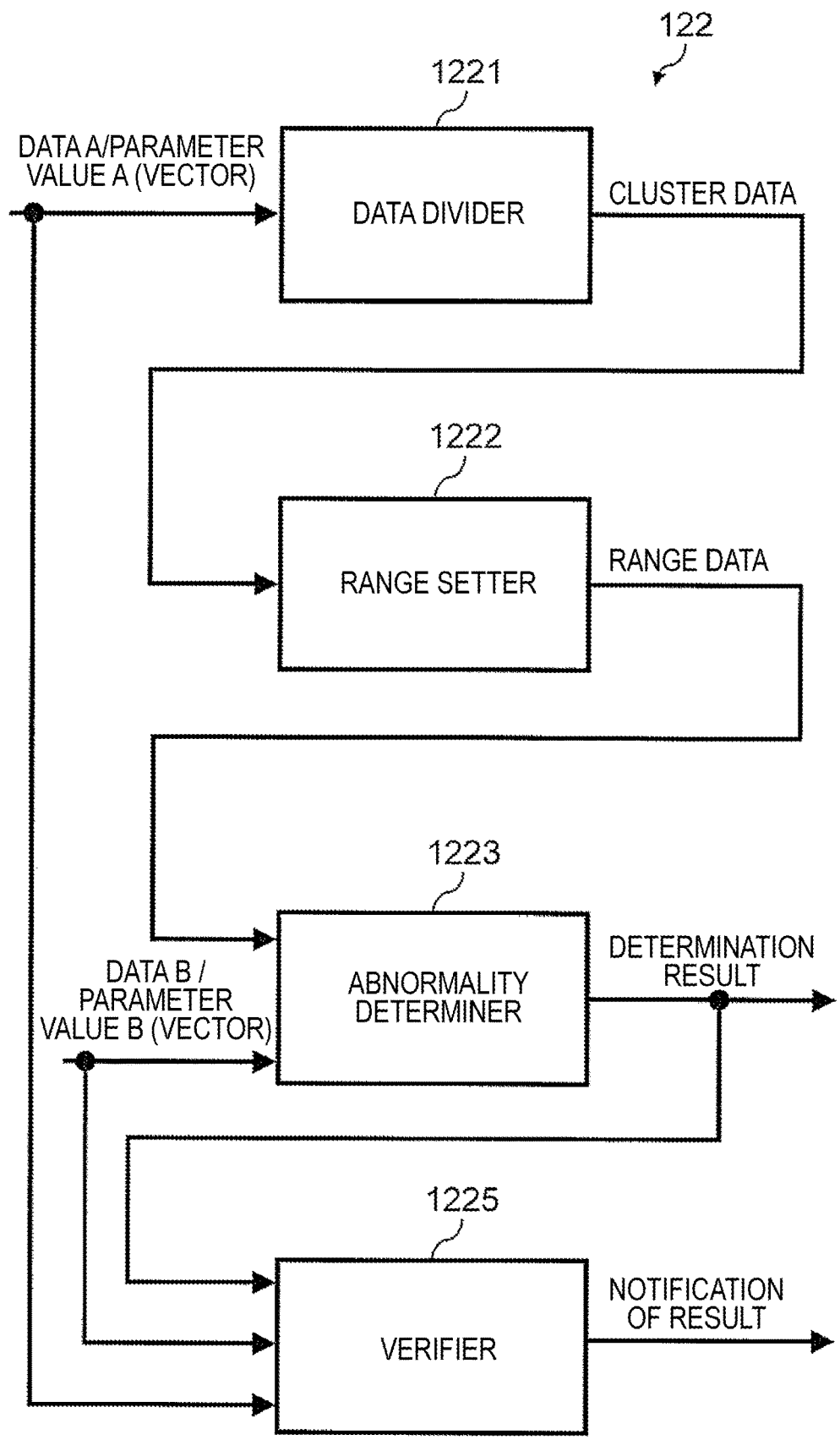
FIG. 20 is a functional block diagram illustrating a detailed configuration of an abnormality detecting unit 122 according to an eighth embodiment.

FIG. 20 is a functional block diagram illustrating a detailed configuration of the abnormality detecting unit 122 according to the eighth embodiment. The abnormality detecting unit 122 according to the eighth embodiment includes a verifier 1225 in addition to the configuration described in the first embodiment. The other configuration is substantially the same as in the first embodiment and thus differences associated with the verifier 1225 will be mainly described below.

The verifier 1225 receives a data series (data A) which is used for the data divider 1221/the range setter 1222 to perform clustering and setting of a normal range and stores the received data series, for example, in a storage device such as the RAM 130. The verifier 1225 acquires a new operation result (data B) from the processing unit 121 after the data divider 1221/the range setter 1222 has performed clustering and setting of a normal range. The verifier 1225 notifies that data B is normal when data B matches one of data A, and notifies that data B is abnormal when data B does not match any of data A. The notification result may be stored, for example, in the RAM 130 or may be output as an output signal to the outside.

By employing the abnormality detection device 100 according to the eighth embodiment, for example, it is possible to verify an operation of the abnormality detection device 100 illustrated in the first to seventh embodiments using data with a clear lineage. Accordingly, it is possible to enhance reliability of software corresponding to the abnormality detection device 100 and the processing unit 121.

Ninth Embodiment

Figure 21:
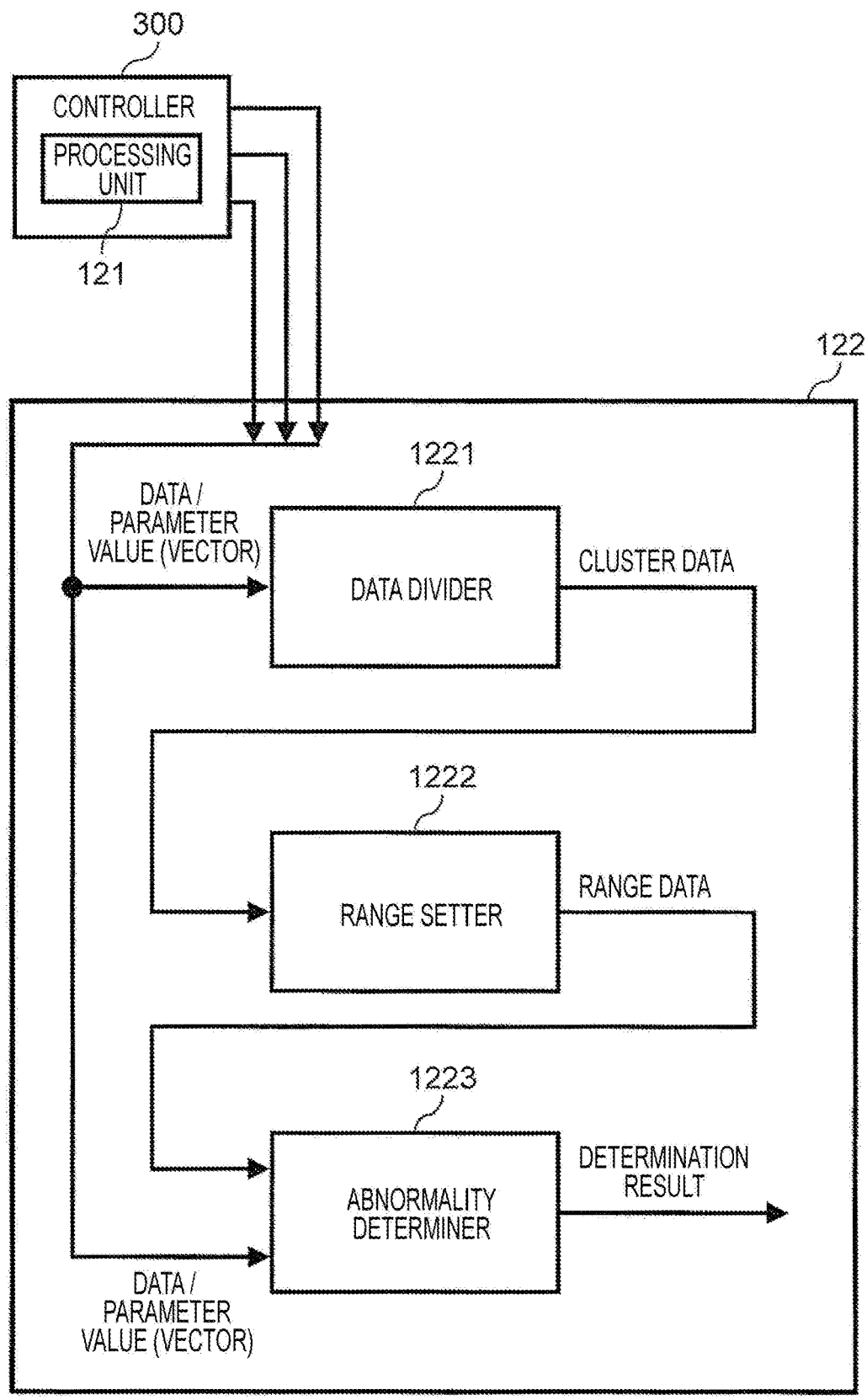
FIG. 21 is a diagram illustrating an abnormality detection device 100 according to a ninth embodiment and a peripheral configuration thereof.

FIG. 21 is a diagram illustrating the abnormality detection device 100 according to a ninth embodiment and a peripheral configuration thereof. In the first to eighth embodiments, the processing unit 121 and the abnormality detecting unit 122 do not need to be configured in the same device, and may be configured as separate devices. For example, in the configuration illustrated in FIG. 21, the processing unit 121 is configured in a terminal device 300, and the abnormality detection device 100 (that is, the abnormality detecting unit 122) acquires an operation result by the processing unit 121 from the terminal device 300.

In the configuration example illustrated in FIG. 21, the abnormality detection device 100 and the terminal device 300 are connected to each other via an appropriate communication line, the abnormality detection device 100 acquires an operation result from the processing unit 121 via the communication line and stores the acquired operation result, for example, in the RAM 130, and the abnormality detecting unit 122 can acquire the operation result via the RAM 130.

Modified Examples of the Invention

The invention is not limited to the above-mentioned embodiments and includes various modified examples. For example, the above-mentioned embodiments have described in detail for the purpose of easy understanding of the invention, and all the elements described therein do not have to be included. Some of the elements of one embodiment can be replaced with elements of another embodiment, and an element of one embodiment may be added to the elements of another embodiment. Some elements of one embodiment can be subjected to addition, deletion, or replacement of another element.

In the above-mentioned embodiments, all or some of the operation units included in the abnormality detection device 100 may be configured in a cloud computing environment. For example, the data divider 1221 and the range setter 1222 may be constructed in cloud, and the processing unit 121 may be constructed in one or more terminal devices using the cloud. The abnormality determiner 1223 may be constructed in each terminal device and each terminal device may detect an abnormality of its own processing unit 121. For example, it is conceivable that a plurality of terminal devices 300 each of which is illustrated in FIG. 21 are provided, and each terminal device 300 includes the processing unit 121 and the abnormality determiner 1223 and uses the data divider 1221 and the range setter 1222 which are constructed in the cloud.

The elements, functions, processing units, processing means, and the like may be embodied in hardware, for example, by designing a part or all thereof as an integrated circuit. The elements, functions, and the like may be embodied in software by causing a processor to interpret and execute programs for realizing the functions. Information on programs, tables, files, and the like for realizing the functions can be stored in a recording device such as a memory, a hard disk, or a solid state drive (SSD) or a recording medium such as an IC card, an SD card, or a DVD.

REFERENCE SIGNS LIST

100 abnormality detection device
110 CPU
120 ROM
121 processing unit
122 abnormality detecting unit
1221 data divider
1222 range setter
1223 abnormality determiner
1224 temporal pattern frequency calculator
1225 verifier
130 RAM
140 data bus
150 input circuit
160 input/output port
170 output circuit
200 control object
300 terminal device

The invention claimed is:

1. An abnormality detection device that detects an abnormality of an operation result which is acquired by causing a processor to execute software, the abnormality detection device comprising:
 a divider that acquires a plurality of operation results from a storage device that stores the plurality of operation results and divides the acquired operation results into one or more groups;
 a range setter that sets a normal range of the operation result for each group using a range of data values included in the operation results included in each group; and
 an abnormality determiner that acquires a new operation result from the storage device and determines whether the new operation result is normal on the basis of the normal range after the range setter has set the normal range;
 wherein the divider generates vector data having one or more dimensions using the plurality of operation results;
 wherein the divider correlates types of the plurality of operation results with the dimensions of the vector data and then generates the vector data at the time of generating the vector data;
 wherein the range setter sets the normal range for each dimension of the vector data; and
 wherein the abnormality determiner determines whether the new operation result is normal on the basis of whether the new operation result is included in the normal range in the dimension of the vector data corresponding to the type of the new operation result, wherein the software has a process of calculating at least one of an intake air amount of an internal combustion engine, a fuel injection amount of the internal combustion engine, and an ignition time of the internal combustion engine as a control command value for controlling the internal combustion engine mounted therein, and wherein the divider acquires at least one of the intake air amount, the fuel injection amount, and the ignition time which are calculated by causing the processor to execute the software as the plurality of operation results.

2. The abnormality detection device according to claim 1, wherein the range setter sets a minimum value in each dimension of the vector data generated by the divider as a lower limit value in the dimension corresponding to the normal range, and wherein the range setter sets a maximum value in each dimension of the vector data generated by the divider as an upper limit value in the dimension corresponding to the normal range.

3. The abnormality detection device according to claim 1, wherein the abnormality determiner specifies the group to which the new operation result is closest in a vector space of the vector data as a closest group, and wherein the abnormality determiner determines that the new operation result is normal when the new operation result is included in the normal range set by the range setter for the closest group and determines that the new operation result is abnormal when the new operation result is not included in the normal range.

4. The abnormality detection device according to claim 3, wherein the abnormality determiner specifies the group having an average value closest to the new operation result among average values of the groups in the vector space of the vector data as the closest group.

5. The abnormality detection device according to claim 1, wherein the divider acquires a parameter which is calculated by the processor in the course of executing the software as the plurality of operation results.

6. The abnormality detection device according to claim 1, wherein the software has a process of calculating a control command value for controlling a control object mounted therein, and wherein the divider acquires the control command value which is acquired by causing the processor to execute the software as the plurality of operation results.

7. The abnormality detection device according to claim 1, wherein the software has a process of calculating a control command value for controlling a control object mounted therein, and wherein the divider acquires a signal value which is output from a sensor included in the control object or a processed value which is obtained by performing a processing process on the signal value as the plurality of operation results.

8. The abnormality detection device according to claim 1, wherein the software has a process of calculating a tension in a rolling process, a rolling position in the rolling process, and a rolling material moving speed in the rolling process as a control command value for controlling the rolling process of a steel plant mounted therein, and wherein the divider acquires the tension, the rolling position, and the rolling material moving speed which are calculated by causing the processor to execute the software as the plurality of operation results.

9. The abnormality detection device according to claim 1, further comprising a notification unit that notifies a determination result from the abnormality determiner.

10. The abnormality detection device according to claim 1, wherein the software has a process of controlling an operation of a terminal device mounted therein, and wherein the divider acquires a parameter which is acquired by causing a processor included in the terminal device to execute the software as the plurality of operation results from a plurality of terminal devices.

11. The abnormality detection device according to claim 1, wherein the abnormality determiner determines that the new operation result is normal when the new operation result matches one of the plurality of operation results and determines that the new operation result is abnormal when the new operation result does not match any of the plurality of operation results.

12. An abnormality detection device that detects an abnormality of an operation result which is acquired by causing a processor to execute software, the abnormality detection device comprising:

a divider that acquires a plurality of operation results from a storage device that stores the plurality of operation results and divides the acquired operation results into one or more groups;

a range setter that sets a normal range of the operation result for each group using a range of data values included in the operation results included in each group; and an abnormality determiner that acquires a new operation result from the storage device and determines whether the new operation result is normal on the basis of the normal range after the range setter has set the normal range;

wherein the divider acquires time-series data which is acquired by causing the processor to execute the software in a time series as the plurality of operation results;

wherein the abnormality detection device further comprises a transition pattern calculator that calculates a transition pattern in which the operation result at each time in the time-series data transitions between the groups; and wherein the abnormality determiner determines that the new operation result is abnormal when the new operation result is included in the normal range but departs from the transition pattern;

wherein the abnormality detection device acquires the new operation result as new time-series data which is acquired by causing the processor to execute the software in a time series, wherein the transition pattern calculator calculates an occurrence frequency of a new transition pattern in which the new operation result at each time in the new time-series data transitions between the groups for each transition path between the groups, and wherein the abnormality determiner determines that the new operation result is abnormal when the occurrence frequency of the new transition pattern is less than a predetermined threshold value at least one of the times and the new operation result is included in the normal range, wherein the software has a process of calculating at least one of an intake air amount of an internal combustion engine, a fuel injection amount of the internal combustion engine, and an ignition time of the internal combustion engine as a control command value for controlling the internal combustion engine mounted therein, and wherein the divider acquires at least one of the intake air amount, the fuel injection amount, and the ignition time which are calculated by causing the processor to execute the software as the plurality of operation results.

* * * * *